(12) United States Patent
Azevedo et al.

(10) Patent No.: US 8,474,366 B2
(45) Date of Patent: Jul. 2, 2013

(54) PISTON WITH A SKIRT HAVING OIL FLOW SLOTS AND METHOD OF CONSTRUCTION THEREOF

(75) Inventors: Miguel Azevedo, Ann Arbor, MI (US); Andrew Leibold, Monroe, MI (US); Airton Martins, Granger, IN (US)

(73) Assignee: Federal-Mogul Corporation, Southfield, MI (US)

( * ) Notice: Subject to any disclaimer, the term of this patent is extended or adjusted under 35 U.S.C. 154(b) by 889 days.

(21) Appl. No.: 12/617,772

(22) Filed: Nov. 13, 2009

(65) Prior Publication Data

US 2010/0050861 A1    Mar. 4, 2010

Related U.S. Application Data

(63) Continuation-in-part of application No. 12/190,256, filed on Aug. 12, 2008, now Pat. No. 8,042,453.

(60) Provisional application No. 60/955,423, filed on Aug. 13, 2007.

(51) Int. Cl.
  *F02F 3/00* (2006.01)
  *F16J 1/04* (2006.01)

(52) U.S. Cl.
  USPC ................................. 92/237; 92/160; 92/235

(58) Field of Classification Search
  USPC ................... 92/158, 159, 160, 234, 235, 236, 92/237, 239
  See application file for complete search history.

(56) References Cited

U.S. PATENT DOCUMENTS

| | | | |
|---|---|---|---|
| 1,336,690 A | | 4/1920 | Flammang |
| 1,336,691 A | | 4/1920 | Flammang |
| 1,351,238 A | | 8/1920 | Flammang |
| 1,387,593 A | | 8/1921 | Crispin |
| 1,592,874 A | * | 7/1926 | Udale ............................. 92/239 |
| 1,719,092 A | | 7/1929 | Taylor |
| 1,758,444 A | | 5/1930 | Jehle et al. |
| 1,759,110 A | | 5/1930 | Graves |
| 2,009,243 A | * | 7/1935 | Welch ............................. 92/159 |
| 2,032,849 A | | 3/1936 | Nelson |
| 2,147,956 A | | 2/1939 | Alexandrescu |
| 2,309,555 A | * | 1/1943 | Bowser, Jr. et al. ............. 92/237 |
| 2,407,440 A | * | 9/1946 | Osborne ......................... 92/159 |

(Continued)

FOREIGN PATENT DOCUMENTS

| | | |
|---|---|---|
| DE | 3428490 | 2/1986 |
| DE | 3428490 A1 | 2/1986 |

(Continued)

OTHER PUBLICATIONS

International Search Report; Mar. 25, 2011.

*Primary Examiner* — Thomas E Lazo
(74) *Attorney, Agent, or Firm* — Robert L. Stearns; Dickinson Wright, PLLC

(57) ABSTRACT

A piston has a pair of diametrically opposite skirt portions with convex outer surfaces. Each skirt portion has opposite side edges extending substantially parallel to a central axis of the piston to a free end. The skirt portions each have a recessed slot extending radially into the convex outer surface to a recessed surface. The recessed surface extends fully across the convex outer surface to the side edges and separates an upper band section of the convex outer surface from a lower band section of the convex outer surface.

24 Claims, 9 Drawing Sheets

U.S. PATENT DOCUMENTS

| | | | |
|---|---|---|---|
| 2,705,667 A * | 4/1955 | Fahlman et al. | 92/232 |
| 3,307,456 A | 3/1967 | Etienne | |
| 4,354,426 A | 10/1982 | Steidle | |
| 4,674,399 A | 6/1987 | Bruni | |
| 4,691,622 A | 9/1987 | Sander et al. | |
| 4,702,151 A | 10/1987 | Munro et al. | |
| 4,704,949 A | 11/1987 | Foster | |
| 4,715,267 A * | 12/1987 | Richmond | 92/237 |
| 4,809,652 A | 3/1989 | Essig et al. | |
| 4,876,947 A | 10/1989 | Rhodes | |
| 4,989,559 A | 2/1991 | Fletcher-Jones | |
| 7,836,815 B2 * | 11/2010 | Doers et al. | 92/159 |

FOREIGN PATENT DOCUMENTS

| | | |
|---|---|---|
| DE | 3437111 | 4/1986 |
| EP | 0030399 | 6/1981 |
| EP | 0043147 | 1/1982 |
| EP | 0043147 A1 | 1/1982 |
| EP | 0050257 | 4/1982 |
| EP | 0050257 A1 | 4/1982 |
| FR | 661603 | 7/1929 |
| GB | 615274 | 1/1949 |
| JP | 61043254 | 3/1986 |
| JP | 03110157 | 11/1991 |
| JP | 04109066 | 4/1992 |
| JP | 04109066 A | 4/1992 |
| JP | 08200150 | 8/1996 |
| JP | 10122040 | 5/1998 |
| JP | 200569219 | 3/2005 |
| KR | 1019970045043 | 7/1997 |
| KR | 1019990042865 | 6/1999 |
| KR | 1019990042869 | 6/1999 |

* cited by examiner

PISTON WITH A SKIRT HAVING OIL FLOW SLOTS AND METHOD OF CONSTRUCTION THEREOF

CROSS-REFERENCE TO RELATED APPLICATION

This application is a continuation-in-part of U.S. patent application Ser. No. 12/190,256, filed Aug. 12, 2008 now U.S. Pat No. 8,042,453, which claims the benefit of U.S. Provisional Application Ser. No. 60/955,423, filed Aug. 13, 2007, both of which are incorporated herein by reference in their entirety.

BACKGROUND OF THE INVENTION

1. Technical Field

This invention relates generally to internal combustion engines, and more particularly to pistons for heavy duty diesel engines.

2. Related Art

It is known that internal combustion engines, and particularly diesel engines, experience high oil consumption that leads to undesirable exhaust emissions. In addition, with the oil consumption comes carbon build-up on surfaces of pistons, particularly in the top land area, including in the annular ring grooves. As such, the ring movements can be restricted by the carbon build-up, thereby diminishing the effectiveness of the rings to properly seal the combustion gas and control oil consumption, thereby resulting in increased oil blow-by, reduced engine performance, reduced engine component life, and increased emissions.

In addition to the problems mentioned above, an additional known problem can result from a non-uniform, turbulent flow of oil within the cylinder over the path of piston reciprocation. Some of these additional problems include the onset of liner cavitation and increased friction between the piston and the cylinder liner. The liner cavitation is sensitive to the configuration of the piston, particularly where the piston is of a monobloc construction having a fixed skirt formed as one piece with the piston. The increased friction is sensitive to secondary movements of the piston, where, for the lack of guidance, the piston reciprocates cocked within the cylinder liner. Oil control loss can be traced to the high velocity of piston travel, generating a standing wave of oil. If such is the case in the upper portion of the skirt, it results in a phenomenon referred to as "oil flooding". As such, the majority of the oil is maintained toward the upper crown of the piston, and oil trickles into the ring belt area. In some cases, such as when the gas pressure gradient across the ring belt is not clearly defined, the first ring groove floods, whereupon the oil consumption control characteristic is lost. A secondary standing wave of oil forms at the upper edge of the first ring groove. Exposure of this oil to the flame front decomposes and carbonizes the oil in the standing wave, generating soot and formation of carbon deposits. As such, although it is desirable to maintain a continual supply of oil in the ring area of a piston, too much can be detrimental to the life of the engine and can also reduce the engine performance.

A piston manufactured according to the present invention and engine therewith overcomes or greatly minimizes the drawbacks resulting from at least those problems discussed above, thereby allowing diesel engines to operate at an increased performance level, while reducing their fuel consumption, oil consumption and exhaust emissions, besides prolonging their useful life.

SUMMARY OF THE INVENTION

A piston includes a piston body having an upper crown portion extending along a central axis along which the piston reciprocates and a pair of pin bosses depending from the upper crown. The pin bosses have pin bores aligned with one another along a pin bore axis. The piston further includes a pair of skirt portions arranged on opposite sides of the pin bore axis with each of the skirt portions having a convex outer surface with opposite side edges extending substantially parallel to the central axis to a free end. The skirt portions each have a recessed slot extending radially into the convex outer surface to a recessed surface. The recessed surface extends fully across the convex outer surface to the side edges, thereby separating an upper band section of the convex outer surface from a lower band section of the convex outer surface.

In accordance with another aspect of the invention, a method of constructing a piston is provided. The method includes providing a piston body having an upper crown portion extending along a central axis with a pair of pin bosses depending from the upper crown and having pin bores aligned with one another along a pin bore axis with a pair of skirt portions arranged on opposite sides of the pin bore axis having a convex outer surface. And further, forming a recessed slot extending radially into the convex outer surface.

Pistons manufactured in accordance with the present invention improve oil flow over a complete cycle of the piston, reduce dynamic viscous friction over the cycle of the piston, improve the guidance of the piston throughout its complete cycle, reduce cylinder liner cavitation, reduce piston viscous friction loss, reduce carbon build-up in ring grooves of the piston and on piston rings with the grooves, improve the movement of the piston rings, reduce oil consumption and formed carbon adhered to the top land, therefore reducing bore polishing typically caused by carbon build-up, reduce exhaust emissions, and overall improve the running performance and life of the engine. The sum of these beneficial effects reduces engine fuel consumption and promotes more miles-to-gallon.

BRIEF DESCRIPTION OF THE DRAWINGS

These and other aspects, features and advantages of the invention will become readily apparent to those skilled in the art in view of the following detailed description of the presently preferred embodiments and best mode, appended claims, and accompanying drawings, in which:

DETAILED DESCRIPTION OF PRESENTLY PREFERRED EMBODIMENTS

Figure 1:
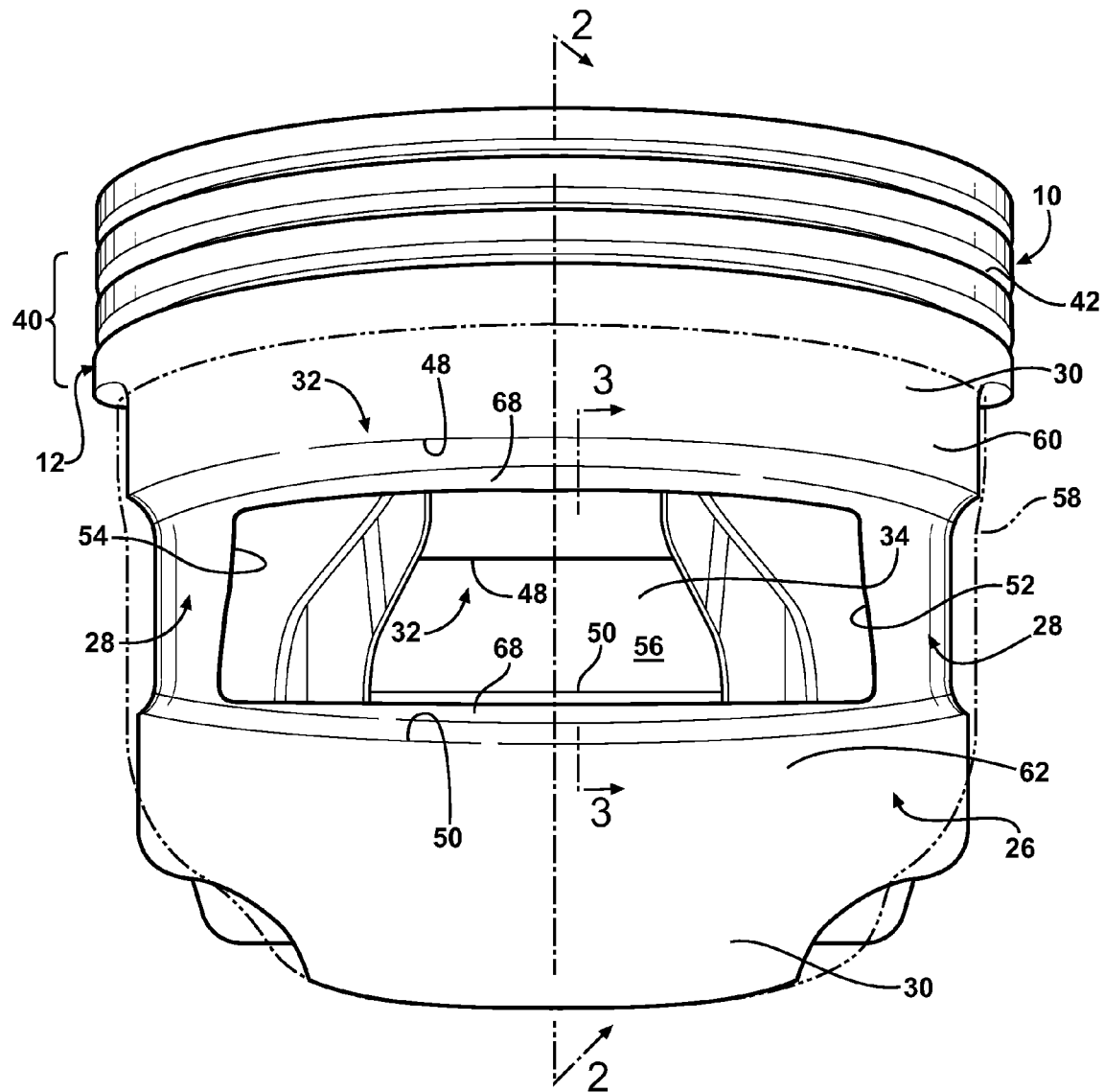
FIG. 1 is a partial perspective view of a piston construction according to a presently preferred embodiment of the invention.
Figure 2:
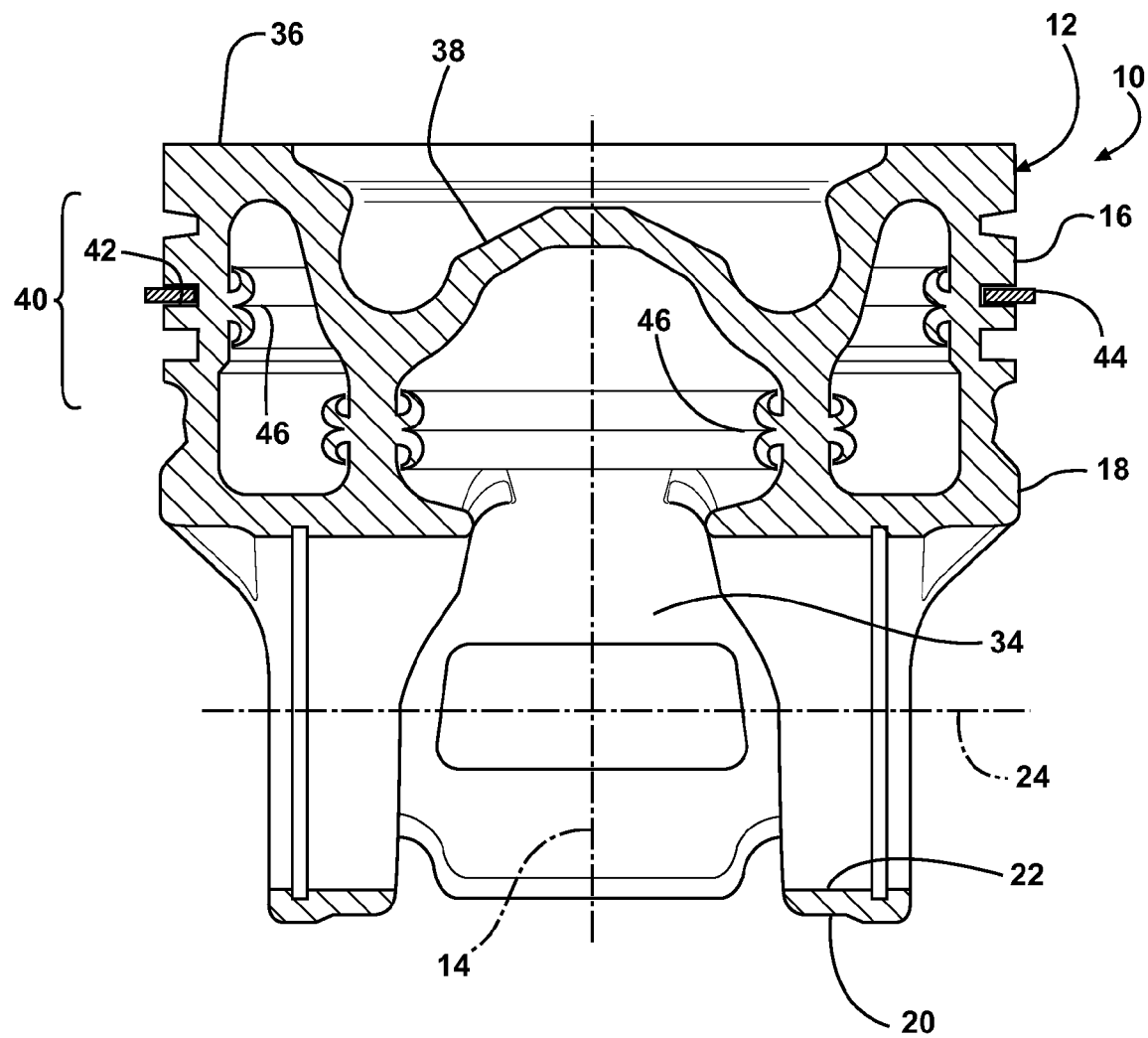
FIG. 2 is a cross-sectional view taken generally along the line 2-2 of FIG. 1.

Referring in more detail to the drawings, FIGS. 1 and 2 illustrate a piston 10 constructed according to one presently preferred embodiment of the invention for reciprocating movement in a cylinder bore (not shown) of an internal combustion engine, such as a diesel engine. The piston 10 has a body 12, either cast or forged, or by any other process of manufacture, extending along a central axis 14 along which the piston 10 reciprocates in the cylinder bore. The body 12 is represented, by way of example and without limitation, as having an upper crown 16 joined to a lower crown 18 having a pair of pin bosses 20 depending from the upper crown to provide laterally spaced pin bores 22 aligned along a pin bore axis 24 that extends generally transverse to the central axis 14. By way of example and without limitation, the pin bosses 20 are joined to laterally spaced skirt portions 26 via strut portions 28, thereby forming a so called "monobloc" piston wherein the skirt portions 26 are formed as one piece of material with the pin bosses 20. The skirt portions 26 are diametrically spaced from one another across the pin bore axis 24 and have convex outer surfaces 30 contoured for cooperation with the cylinder bore to maintain the piston 10 in a desired orientation as it reciprocates through the cylinder bore. During reciprocation, a hydrodynamic oil film is developed and maintained between the outer surfaces 30 of the skirt portions 26 and the wall of the cylinder bore to minimize dynamic friction therebetween. To facilitate maintaining the desired hydrodynamic oil film thickness and distribution of oil across the outer surfaces 30 of the skirt portions 26, through slots, referred to hereafter as openings 32 unless otherwise stated, are formed in the skirt portions 26.

The upper crown 16 of the piston 10 is represented here as having an upper surface 36 with a combustion bowl 38 recessed therein to provide a desired gas flow with the cylinder bore. An outer wall or ring belt 40 extends downwardly from the upper surface 36, with at least one annular ring groove 42 being formed in the ring belt 40 for floating receipt of a piston ring 44. The piston ring 44, when properly functioning in its free floating state, facilitates guiding the piston 10 during reciprocation within the cylinder bore, while also sealing combustion gases and inhibiting the passage of oil upwardly thereby from below the piston body 12.

The lower crown 18 is represented here as being formed separately from the upper crown 16, such as in a forging process, and then joined thereto, wherein the upper and lower crowns 16, 18 can be joined together by a weld joint 46, for example.

It should be recognized that a piston 10 constructed in accordance with the invention could have an upper and lower crown portions formed otherwise, such as in a casting process, for example, and that they could be joined using mechanisms other than a weld joint.

Figure 2A:
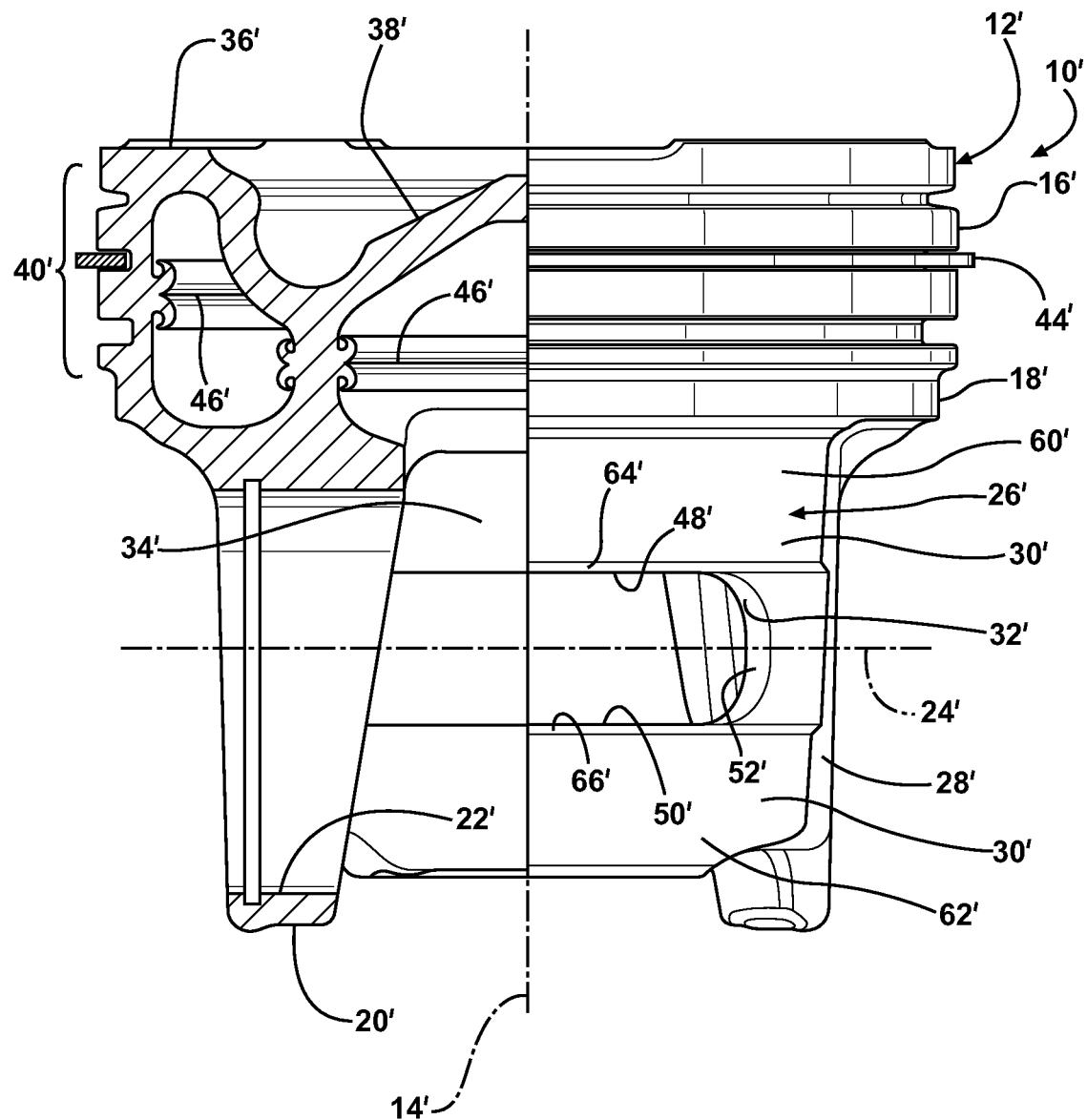
FIG. 2A is a quarter cross-sectional view of a piston construction according to another presently preferred embodiment of the invention.

A piston construction in accordance with another presently preferred embodiment is shown in FIG. 2A generally at 10'. The same reference numerals discussed above and below have been applied to designate like features, wherein the reference numerals are primed.

Figure 3:
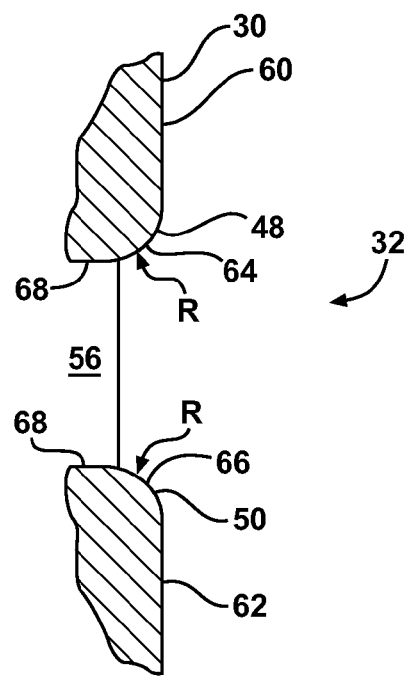
FIG. 3 is a schematic fragmentary cross-sectional view taken generally along the line 3-3 showing a slot in a skirt of the piston in accordance with one presently preferred embodiment of the invention.

As shown in FIGS. 1 and 3, the openings 32 in the skirt portions 26 have upper and lower edges 48, 50, respectively, extending generally parallel to a horizontal plane extending through the pin bore axis 24 and generally transverse to the central axis 14 and sides 52, 54 extending generally transverse to the horizontal plane between the upper and lower edges 48, 50. The upper and lower edges 48, 50 correspond generally to a length of the opening 32, while the sides 52, 54 correspond generally to a width of the opening 32, although the maximum widths can extend or bow outwardly from the sides 52, 54. The relation of the length to the width of the opening 32 is such that the length is greater than the width, however, the aspect ratio of length-to-width is relatively low. As such, the openings 32 are generally wide. Each of the openings 32 provides an open space 56 occupying between about 20-80 percent of the respective total area of the respective skirt portion 26, wherein the individual skirt portion total area is bordered generally by an outer perimeter 58 (FIG. 1) of the skirt outer surface 30. Accordingly, the area of the skirt outer surface 30 capable of being moved into frictional engagement with the cylinder bore is reduced to between about 20-80 percent of the total area of the skirt portion 26, depending on the relative size of the opening 32 to the total area of the skirt portion 26. As such, the potential dynamic frictional losses resulting between the skirt portions 26 and the cylinder wall is reduced, in addition to significantly reducing the weight of the piston. It has been discovered that an opening forming about a 40 percent reduction in the skirt outer surface area results in about an 80 percent reduction in friction from the maximum practically achievable.

The openings 32 extend sufficiently across the skirt portions 26 to form upper and lower band sections 60, 62. The upper and lower band sections 60, 62 can be provided having a generally symmetrical shape, but non-symmetrical shapes are also contemplated, depending on the intended application. Included herein is the aspect that openings 32 can be configured in such a way as to provide discrete bearing "pads", i.e., distinct individually isolated load bearing areas. Much of the present discussion about approach and trailing angles to the skirt band sections also apply rigorously, possibly more so, to these discrete pads. This latter configuration is not depicted by drawings, but is an aspect considered to within the scope of this invention.

As best shown in FIG. 3, the upper and lower edges 48, 50 have respective smooth rounded, and referred to hereafter as chamfered surfaces 64, 66, extending from the outer surface 30 of the skirt portion 26 to an inner surface 68 of the opening 32. The upper and lower chamfered surfaces 64, 66 are shown here, by way of example, as being generally symmetrical to one another and having a corner radius (R) without sharp corners. It is believed that a parabolic radius corresponding to a formula $y=ax^2$ is desirable, as this formula has a second derivative of $d^2y/dx^2=2a$, which provides constant acceleration of the fluid film. As such, by having constant acceleration, laminar flow of the oil is promoted, thereby resulting in reduced turbulence, and thus, reduced cavitation. However, it should be recognized that other polynomial shaped chamfered surface configurations are contemplated herein, including higher order polynomials, for example.

During reciprocation, the smooth chamfered surfaces 64, 66 direct oil both radially inwardly into the openings 32 and into the cavity 34, while also maintaining a sufficient amount of oil between the outer surfaces 30 of the upper and lower band sections 60, 62 and the cylinder bore. During the down stroke, the upper chamfered surface 64 promotes the ingress of oil through the openings 32 and into the cavity 34, and conversely, during the upstroke, the lower chamfered surface 66 promotes the ingress of oil though the openings 32 and into the cavity 34. Accordingly, by directing oil inwardly into the openings 32, the hydraulic pressure gradient is perfectly determined over both bands 60, 62. Thus, the phenomenon of forming a standing wave of oil adjacent the ring belt 40 between the down stoke and upstroke is prevented, thereby eliminating the oil flooding phenomenon in the region of the ring belt 40. As such, carbon deposits in the area of the ring belt 40, and particularly on the piston ring 44 and in the piston ring groove 42 is avoided. As such, the piston ring 44 is able to maintain a free floating motion within the ring groove 42 to facilitate its sealing function within the cylinder bore, while also preventing an oil migration condition to the top land.

Another aspect of this invention, with the bearing surfaces shaped as bands or discreet pads, is that the secondary rocking motion of pistons in the thrust/non-thrust plane permitted by the traditional curved, continuous skirt profile, no longer applies. In fact, the present skirt design can be shaped to effectively present two, three or more focal bearing locations to the parent liner in contact. Limiting to two or three focal points, for discussion purposes only and without limitation, it can be visualized that a line or triangular support is thus provided. The outcome is that the piston is better guided within the confines of the cylinder bore, reciprocating in a concentric fashion. This configuration is conducive to less Coulomb friction and more of a fully hydrodynamic lubrication and a stable reciprocating regime. A corollary to the exposed is that impacts are thus avoided and mechanical excitation of the liner minimized. Cavitation on the coolant side of the liner is thus prevented to a large extent.

Figure 4:
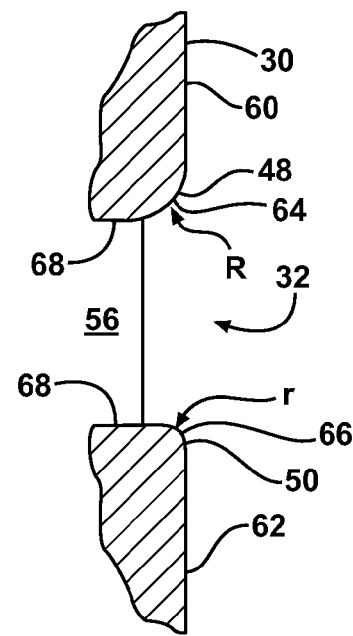
FIG. 4 is a view similar to FIG. 3 showing a slot in the skirt of the piston in accordance with another presently preferred embodiment of the invention.
Figure 5:
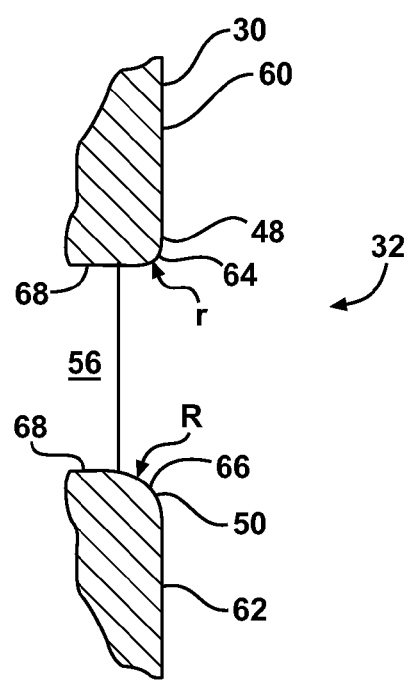
FIG. 5 is a view similar to FIG. 3 showing a slot in the skirt of the piston in accordance with yet another presently preferred embodiment of the invention.

As shown in FIG. 4, the openings 32 can be formed having smooth chamfered surfaces that are non-symmetrical to one another. In this embodiment, the upper chamfered surface 64 has a greater radius of curvature (R), or more gradual polynomial curve in relation to the radius of curvature (r) of the lower chamfered surface 66. Conversely, as shown in FIG. 5, the upper chamfered surface 64 has a reduced radius of curvature (r), or less gradual polynomial curve in relation to the radius of curvature (R) of the lower chamfered surface 66. Accordingly, the openings 32 can be constructed having different configurations, as best suited for the piston application.

Figure 6:
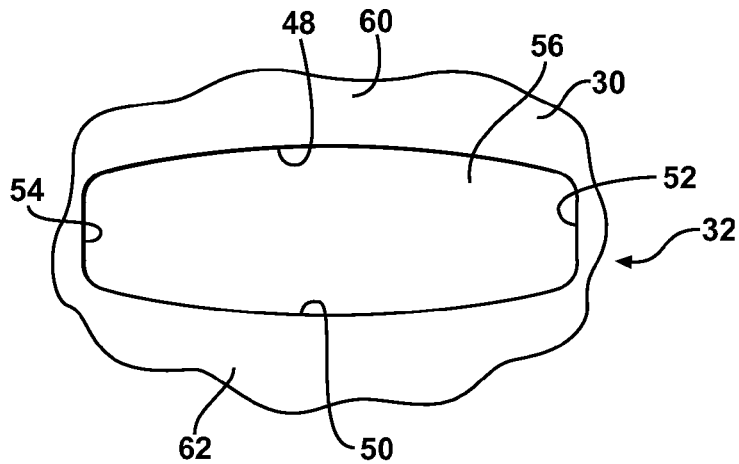
FIG. 6 is a schematic fragmentary side view of the skirt looking into a slot constructed in accordance with one presently preferred embodiment of the invention.
Figure 7:
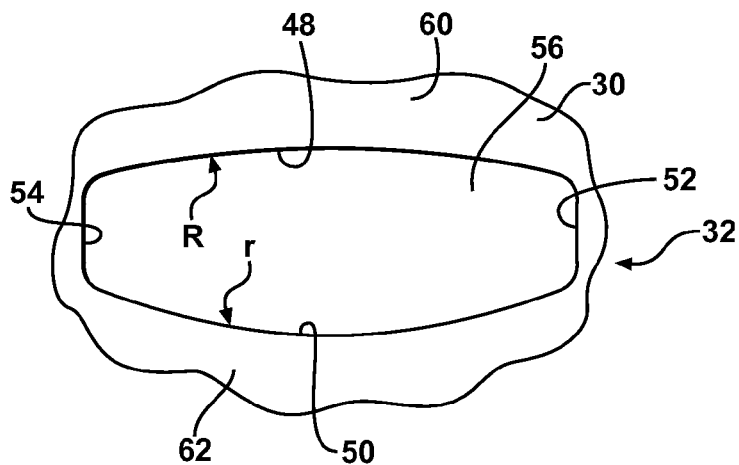
FIG. 7 is a view similar to FIG. 6 showing a slot constructed in accordance with another presently preferred embodiment of the invention.
Figure 8:
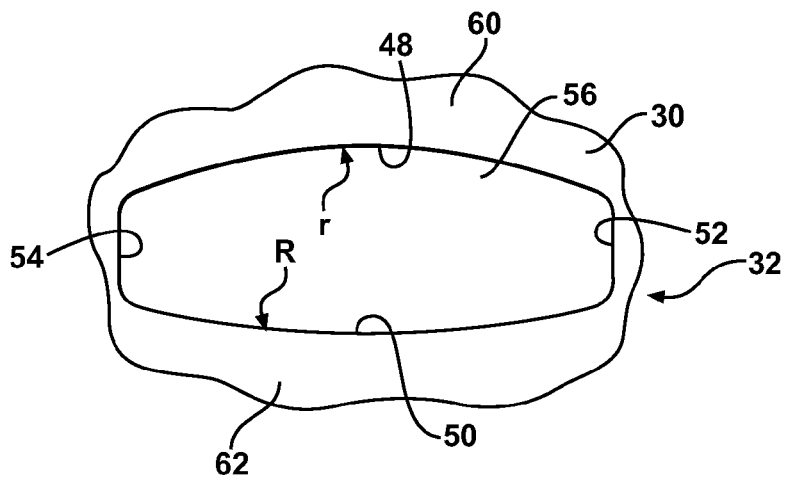
FIG. 8 is a view similar to FIG. 6 showing a slot constructed in accordance with another presently preferred embodiment of the invention.

In addition, as shown in FIG. 6, the openings 32 can be constructed having a generally symmetrical shape along the lengths of the upper and lower edges 48, 50. Otherwise, as shown in FIGS. 7 and 8, the upper and lower edges 48, 50 can be constructed having differing, non-symmetrical shapes. For example, FIG. 7 shows an embodiment of an opening 32 having an upper edge 48 with an increased radius of curvature (R) along its length in relation to the radius of curvature (r) of the lower edge 50. Conversely, FIG. 8 shows an embodiment of an opening 32 having an upper edge 48 with a reduced radius of curvature (r) along its length in relation to the radius of curvature (R) of the lower edge 50. Accordingly, it should be recognized that the openings 32 can be constructed having a multitude of configurations to attain the desired radially inwardly flow of oil through the slots 32 and into the cavity 34, while also maintaining the desired thickness of the hydrodynamic oil layer between the upper and lower band sections 60, 62 and the cylinder bore wall. The same considerations apply if discreet bearing pads are used in lieu of bands. It should also be recognized that various permutations of the discussed embodiments may be configured, such that the radius of chamfered surfaces 64, 66 of the upper and lower edges 48, 50 and the radius of curvature (r,R) of the upper and lower edges 48, 50 along their lengths can be adjusted and combined, as necessary.

Figure 9:
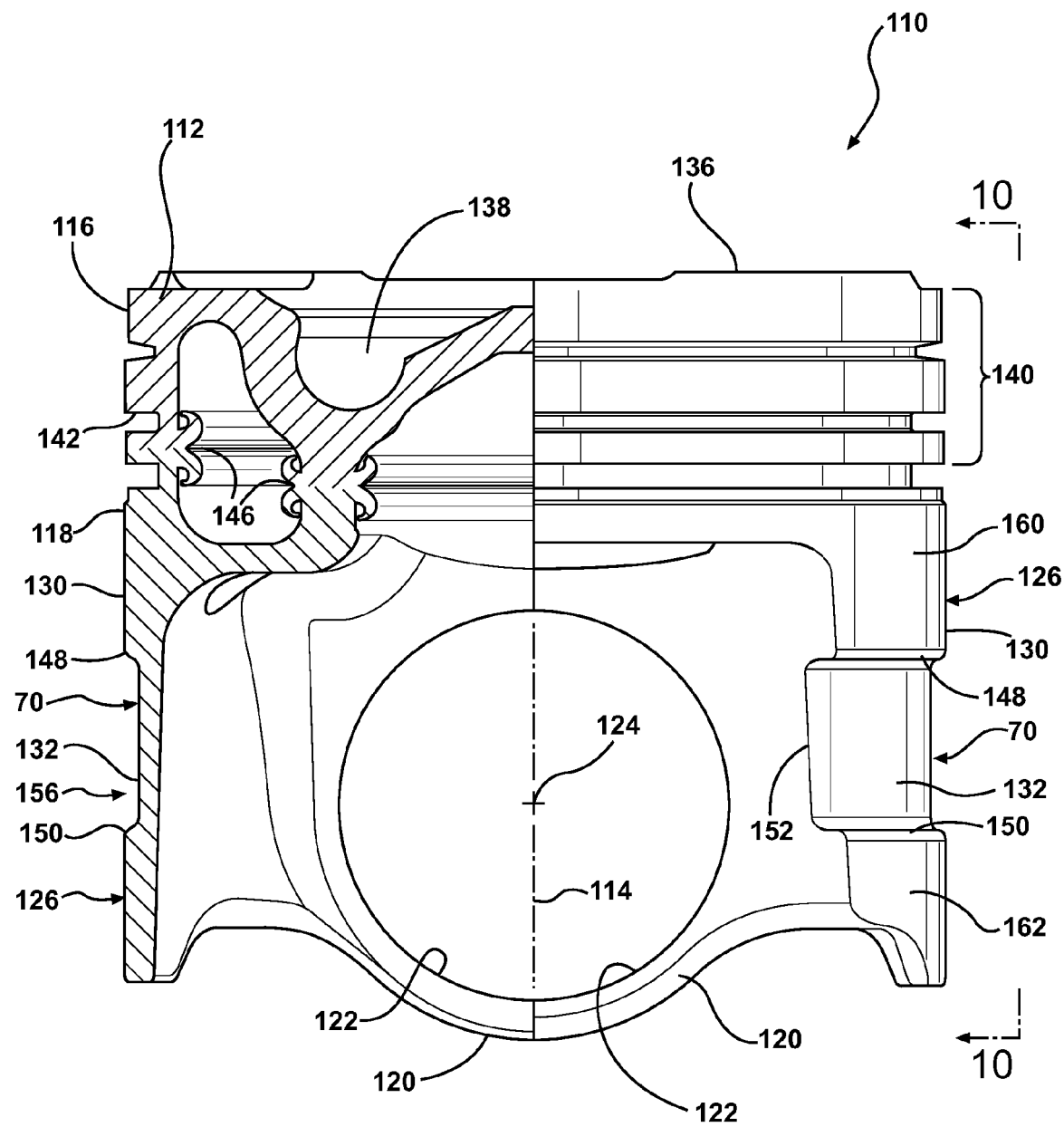
FIG. 9 is a partial cross-sectional view of a piston construction according to another presently preferred embodiment of the invention.
Figure 10:
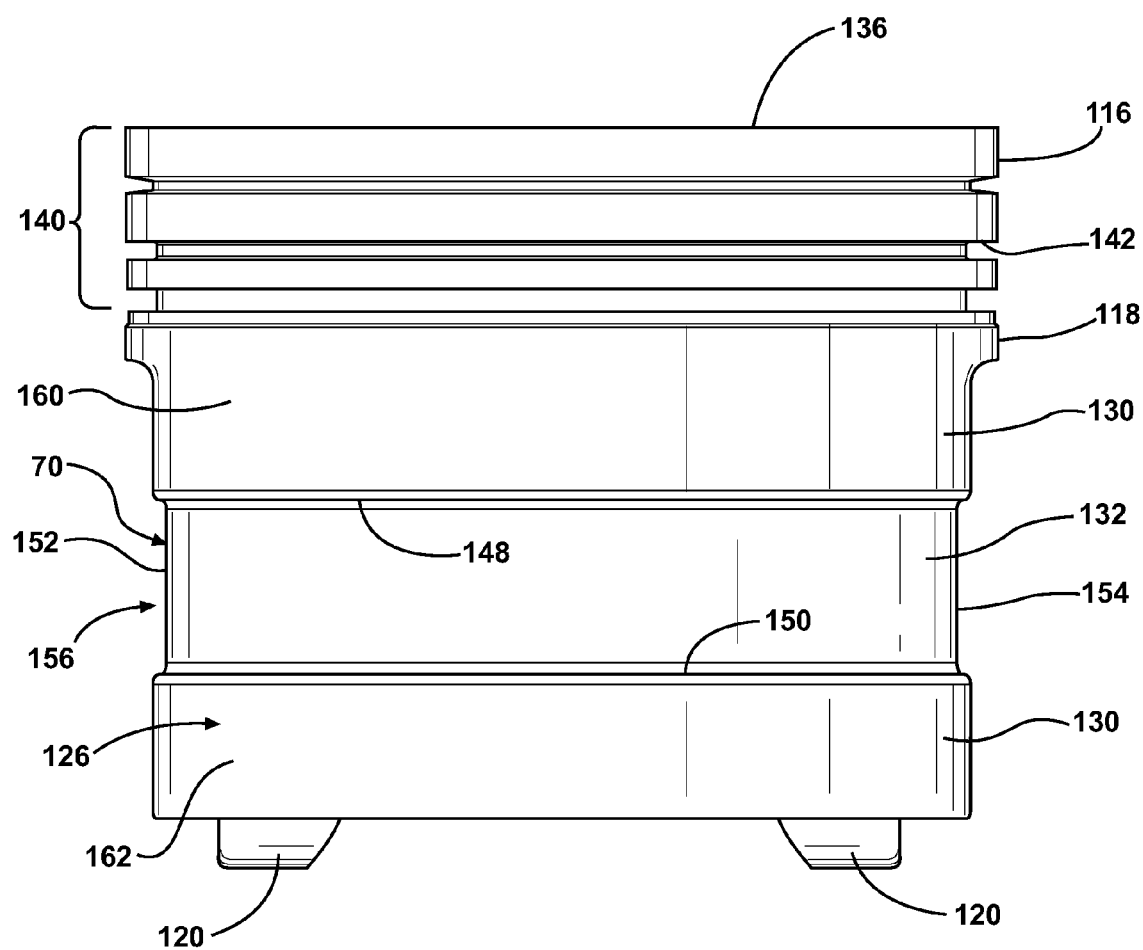
FIG. 10 is a view of the piston of FIG. 9 looking generally in the direction of arrow 10.

In FIGS. 9 and 10, a piston 110 constructed according to another presently preferred embodiment of the invention is shown, wherein the same reference numerals as used above, offset by a factor of 100, are used to identify like features. The piston 110 has a body 112 extending along a central axis 114, as described above, having an upper crown 116 joined to a lower crown 118 with a pair of pin bosses 120 depending from the upper crown to provide laterally spaced pin bores 122 aligned along a pin bore axis 124 that extends generally transverse to the central axis 114. A pair of skirt portions 126 are spaced diametrically from one another across the pin bore axis 124 and have convex outer surfaces 130 contoured for cooperation with the cylinder bore to maintain the piston 110 in a desired orientation as it reciprocates through the cylinder bore. During reciprocation, a hydrodynamic oil film is developed and maintained between the outer surfaces 130 of the skirt portions 126 and the wall of the cylinder bore to minimize dynamic friction therebetween. To facilitate maintaining the desired hydrodynamic oil film thickness and distribution of oil between the outer surfaces 130 of the skirt portions 126 and the wall of the cylinder bore, recessed "blind slots", referred to hereafter as recessed slots or slots 132 unless otherwise stated, are formed in the skirt portions 126.

The upper crown 116 of the piston 110 is represented here as having an upper surface 136 with a combustion bowl 138 recessed therein to provide a desired gas flow with the cylinder bore. An outer wall or ring belt 140 extends downwardly from the upper surface 136, with at least one annular ring groove 142 being formed in the ring belt 140 for floating receipt of a piston ring (not shown).

The lower crown 118 is represented here as being formed separately from the upper crown 116 and can be joined to the upper crown 116 by a friction weld joint 146 or otherwise, as discussed above.

The slots 132 in the skirt portions 126 extend across the full width of the skirt portions 126. The slots 132 have respective upper and lower edges 148, 150 extending parallel or substantially parallel to a horizontal plane extending through the pin bore axis 124 and recessed side edges 152, 154 extending parallel or substantially parallel to the central axis 114. The upper and lower edges 148, 150 correspond generally to a full length of the slot 132, while the side edges 152, 154 correspond generally to a width of the slot 132. The relation of the length to the width of the slot 132 is such that the length is greater than the width. Each of the slots 132 provides a recessed or "blind" pocket, referred to hereafter as space 156, occupying between about 20-80 percent of the respective total surface area of the respective skirt portion 126. Accordingly, the area of the skirt outer surface 130 capable of being moved into frictional engagement with the cylinder bore is reduced to between about 20-80 percent of the total area of the skirt portion 126, depending on the relative size of the slot 132 to the total area of the skirt portion 126. As such, as mentioned above with regard to the piston 10, the potential dynamic frictional losses resulting between the skirt portions 126 and the cylinder wall is reduced, in addition to significantly reducing the weight of the piston.

As mentioned above, the slots 132 extend completely across the skirt portions 126, and thus, form upper and lower band sections 160, 162. The upper and lower band sections 160, 162 can be provided having a generally symmetrical shape, but non-symmetrical shapes are also contemplated, depending on the intended application. Accordingly, it is to be understood that the upper and lower edges 148, 150 can be provided having non-linear configurations, as shown in FIGS. 5-8, for example, and further, it is to be understood that the upper and lower edges 148, 150 can be provided having the same radius of curvature, or different radius of curvature, as shown in FIGS. 3-5. With the recessed slots 132 extending entirely across the full width of the skirt portions 126, the upper and lower band sections 160, 162 provide separate, discrete bearing "pads", i.e., distinct individually isolated load bearing areas, spaced axially from one another along the central axis 114 by the width of the slots 132. The slots 132 extend into the outer surfaces 130 of the skirt portions 126 a predetermined depth to an imperforate, recessed surface 70, and thus, do not extend through the full thickness of the skirt portions 126, as mention above. Accordingly, each recessed surface 70 provides a solid, continuous surface across the entirety of each slot 132. The depth of the slots 132 extends between about 25-75 percent of the total thickness of the skirt portions 126, wherein the percent can vary over the length of the slots 132, as desired. As such, the recessed surface of the slots 132 is assured of maintaining clearance with the wall of the cylinder bore.

Figure 11:
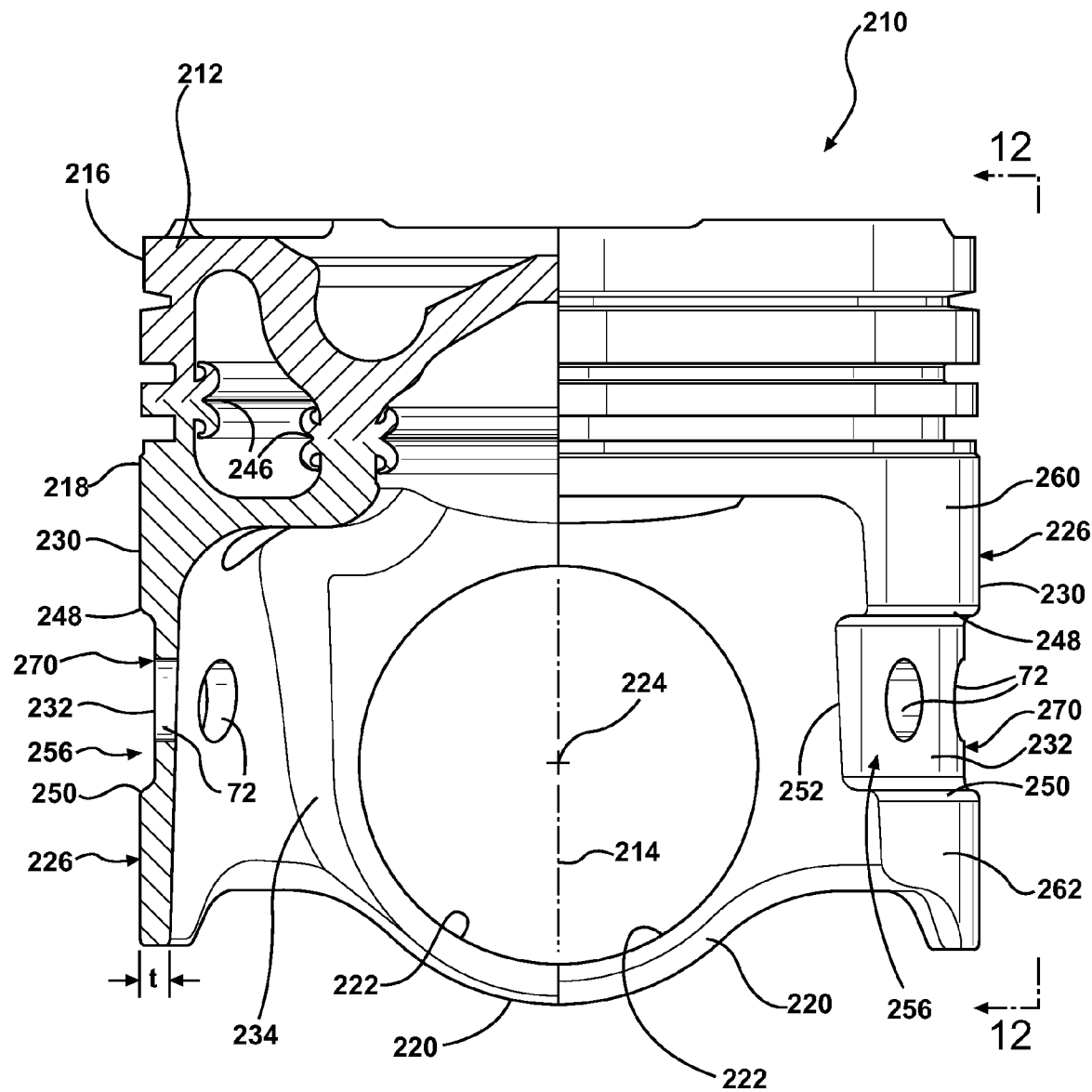
FIG. 11 is a partial cross-sectional view of a piston construction according to another presently preferred embodiment of the invention.
Figure 12:
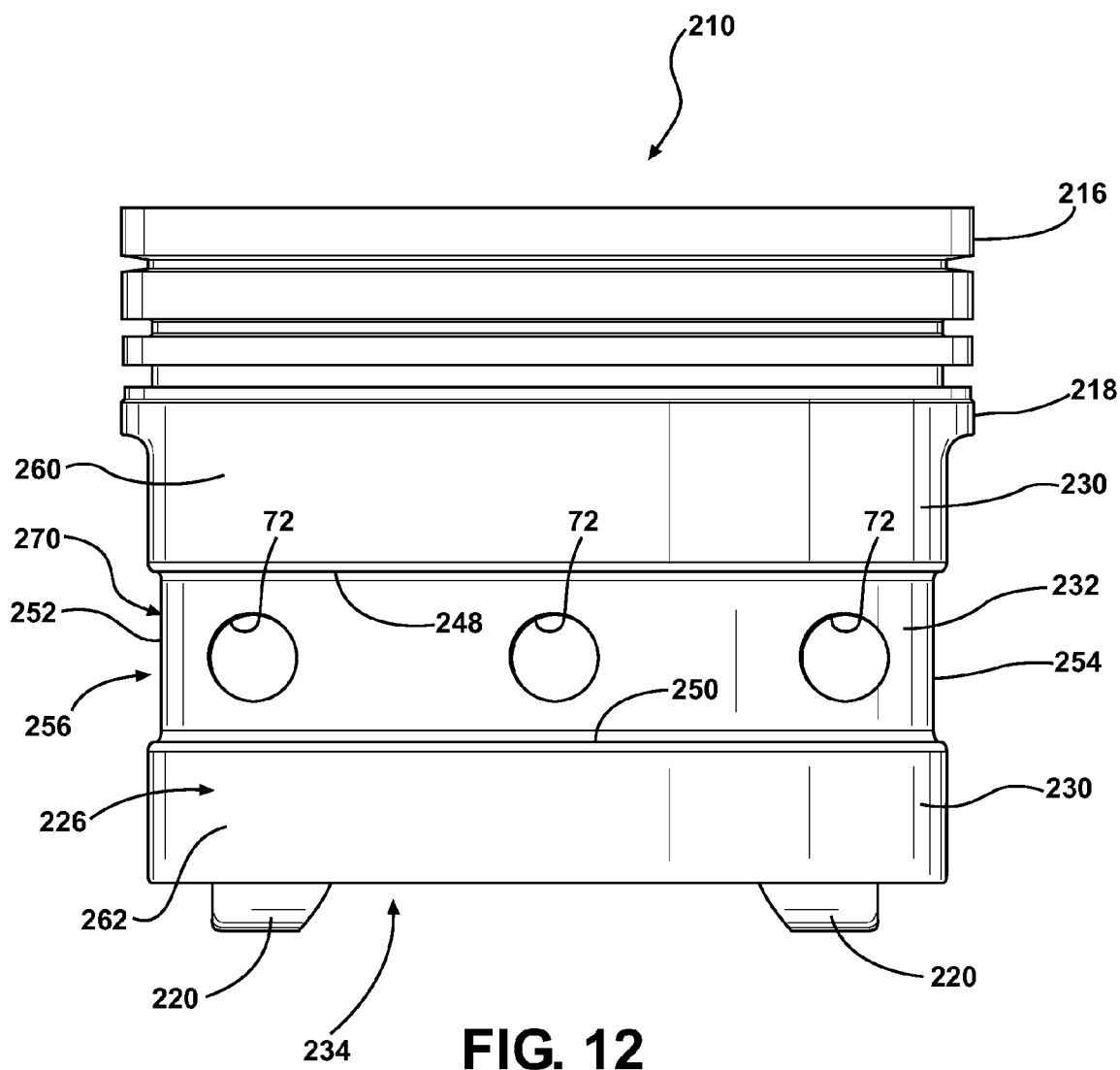
FIG. 12 is a view of the piston of FIG. 11 looking generally in the direction of arrow 12.

In FIGS. 11 and 12, a piston 210 constructed according to another presently preferred embodiment of the invention is shown, wherein the same reference numerals as used above, offset by a factor of 200, are used to identify like features. The piston 210 has a body 212 extending along a central axis 214, as described above, having an upper crown 216 joined to a lower crown 218 with a pair of pin bosses 220 depending from the upper crown to provide laterally spaced pin bores 222 aligned along a pin bore axis 224 that extends generally transverse to the central axis 214. A pair of skirt portions 226 are spaced diametrically from one another across the pin bore axis 224 and have convex outer surfaces 230 contoured for cooperation with the cylinder bore to maintain the piston 210 in a desired orientation as it reciprocates through the cylinder bore. To facilitate maintaining the desired hydrodynamic oil film thickness and distribution of oil between the outer surfaces 230 of the skirt portions 226 and the wall of the cylinder bore, recessed slots 232 are formed in the skirt portions 126. Further, a plurality of holes or through openings 72 extend through the recessed wall into a cavity 234 formed between the skirt portions 226.

As in the embodiments discussed above, the upper crown 216 and lower crown 218 are represented as being formed separately from one another and then joined by a friction weld joint 246 or otherwise, as discussed above.

The slots 232 in the skirt portions 226 extend across the full width of the skirt portions 226. The slots 232 have respective upper and lower edges 248, 250 extending parallel or substantially parallel to a horizontal plane extending through the pin bore axis 224 and recessed side edges 252, 254 extending parallel or substantially parallel to the central axis 214. Each of the slots 232 provides a recessed pocket 256 occupying between about 20-80 percent of the respective total surface area of the respective skirt portion 226. As such, as mentioned with regard to the pistons above 10, 110, the potential dynamic frictional losses resulting between the skirt portions 226 and the cylinder wall is reduced, in addition to significantly reducing the weight of the piston.

The slots 232, as shown, form upper and lower band sections 260, 262 having a generally symmetrical shape to form discrete bearing "pads", as discussed above, but non-symmetrical shapes are also contemplated, depending on the intended application. Accordingly, it is to be understood that the upper and lower edges 248, 250 can be provided having non-linear configurations, as shown in FIGS. 5-8, for example, and further, it is to be understood that the upper and lower edges 248, 250 can be provided having the same radius of curvature, or different radius of curvature, as shown in FIGS. 3-5. The slots 232 extend into the outer surfaces 230 of the skirt portions 226 a predetermined depth to a recessed surface 270, but not through the full thickness of the skirt portions 226. The depth of the slots 232 extends between about 25-75 percent of the total thickness (t) of the skirt portions 226, wherein the percent can vary over the length of the slots 232, as desired. Accordingly, the wall thickness of the recessed slots 232 can vary continuously over the length of the slots 232.

The through openings 72 extending completely through the recessed wall portion, meaning the through openings extend through the recessed surface 270 and open into the cavity 234. The through openings 72 are shown as being cylindrical and having a circular diameter that is less than the width of the slots 232 immediately axially above and below the through openings 72, wherein the width extends between the upper and lower edges 248, 250. Further, the through openings 72 are shown being centered or substantially centered between the upper and lower edges 248, 250. Accordingly, the recess surface 270 extends above and below the through openings 72, such that the through openings 72 are bounded circumferentially by the recessed surface 270. In addition, the through openings 72 in each skirt portion 226 extend along parallel or substantially parallel axes to one another. Further, each of the through openings 72 in one skirt portion 226 are formed diametrically opposite and extend coaxially with one of the through openings 72 in the opposite skirt portion 226. As such, the diametrically opposite through openings 72 that extend coaxially to one another can be formed in a single cutting operation from one side of the piston 210, such as with a cutting tool of sufficient length to extend through both skirt portions 226 from one side of the piston 210. In the embodiment shown, by way of example and without limitation, each skirt portion 226 has three through openings 72, with one through opening 72 being centered between the opposite side edges 252, 254 and the other through openings 72 being located on opposite sides of the centered hole 72 and spaced equidistantly from the centered through opening 72. However, it should be recognized that a different number and configuration of through openings can be used than as shown, whether being even or odd in number.

In accordance with another aspect of the invention, a method of forming the openings and/or slots 32, 32', 132, 232 discussed above and shown in the Figures is provided. The openings and/or slots 32, 32', 132, 232 can be formed having a variety of shapes and sizes as shown and discussed, such as in machining processes including, milling, broaching, laser, drilling, or by forging or casting processes, for example. Further, the openings can be further processed to deburr edges, such as in milling, shot blasting or turning processes, for example. It should be recognized that a combination of the aforementioned manufacturing processes can be used in the construction of the pistons 10, 10', 110, 210. For example, the piston body 12, 12', 112, 212 could first be cast or forged, and then milled, broached, laser formed, or drilled and/or shot blast or turned.

Obviously, many modifications and variations of the present invention are possible in light of the above teachings. It is, therefore, to be understood that within the scope of the appended claims, the invention may be practiced otherwise than as specifically described.

What is claimed is:

1. A piston, comprising:
a piston body having an upper crown portion extending along a central axis along which the piston reciprocates;
a pair of pin bosses depending from said upper crown and having pin bores aligned with one another along a pin bore axis; and
a pair of skirt portions arranged on opposite sides of said pin bore axis, each of said skirt portions having a convex outer surface with opposite side edges extending to a free end and having a recessed slot extending radially into said convex outer surface to a recessed surface, said recessed surface separating an upper band section of said convex outer surface from a lower band section of said convex outer surface, wherein said recessed slots have upper and lower edges extending generally transverse to said central axis, each of said upper and lower edges have a radius of curvature extending from said convex outer surface toward said recessed surface, wherein said radius of curvature is parabolic.

2. The piston of claim 1 wherein each of said recessed slots occupy between about 20 to 80 percent of the area of said outer surface of their respective skirt portion.

3. The piston of claim 1 wherein said upper band section and said lower band section occupy between about 20 to 80 percent of the total area of said outer surface of their respective skirt portion.

4. The piston of claim 1 wherein said upper and lower edges extend generally parallel to a horizontal plane passing through said pin bore axis.

5. The piston of claim 4 wherein each of said upper and lower edges have substantially the same radius of curvature extending from said convex outer surface toward said recessed surface.

6. The piston of claim 4 wherein said upper edge is above said pin bore axis and said lower edge is below said pin bore axis.

7. The piston of claim 1 wherein each of said skirt portions have a wall thickness and said recess slots have a depth of about 25-75 percent of said wall thickness.

8. The piston of claim 1 wherein said piston is a monobloc piston.

9. The piston of claim 1 wherein said recessed surface is imperforate.

10. The piston of claim 1 wherein at least one of said recessed slots has at least one through opening extending through a corresponding one of said recessed surfaces into a cavity between said pin bosses.

11. The piston of claim 10 wherein a plurality of said at least one through opening extends through said corresponding one of said recessed surfaces into said cavity.

12. The piston of claim 11 wherein each said through openings is cylindrical.

13. The piston of claim 11 wherein said plurality of said at least one through opening extend along parallel axes.

14. The piston of claim 10 wherein each of said skirt portions has at least one through opening extending through said corresponding one of said recessed surfaces into said cavity between said pin bosses.

15. The piston of claim 14 wherein each of said at least one through openings in one of said skirt portions extends coaxially with one of said at least one through openings in the other of said skirt portions.

16. A piston, comprising:
a piston body having an upper crown portion extending along a central axis along which the piston reciprocates;
a pair of pin bosses depending from said upper crown and having pin bores aligned with one another along a pin bore axis; and
a pair of skirt portions arranged on opposite sides of said pin bore axis, each of said skirt portions having a convex outer surface with opposite side edges extending substantially parallel to said central axis to a free end and having a recessed slot extending radially into said convex outer surface to a recessed surface, said recessed surface separating an upper band section of said convex outer surface from a lower band section of said convex outer surface, wherein said recessed slots have upper and lower edges extending generally parallel to a horizontal plane passing through said pin bore axis, wherein each of said upper and lower edges have substantially the same radius of curvature extending from said convex outer surface toward said recessed surface, wherein said upper and lower edges have substantially the same radius of curvature extending between said side edges.

17. A piston, comprising:
a piston body having an upper crown portion extending along a central axis along which the piston reciprocates;
a pair of pin bosses depending from said upper crown and having pin bores aligned with one another along a pin bore axis; and
a pair of skirt portions arranged on opposite sides of said pin bore axis, each of said skirt portions having a convex outer surface with opposite side edges extending substantially parallel to said central axis to a free end and having a recessed slot extending radially into said convex outer surface to a recessed surface, said recessed surface separating an upper band section of said convex outer surface from a lower band section of said convex outer surface, wherein said recessed slots have upper and lower edges extending generally parallel to a horizontal plane passing through said pin bore axis, wherein each of said upper and lower edges have substantially the same radius of curvature extending from said convex outer surface toward said recessed surface, wherein said upper and lower edges have different radii of curvature extending between said side edges.

18. A piston, comprising:
a piston body having an upper crown portion extending along a central axis along which the piston reciprocates;
a pair of pin bosses depending from said upper crown and having pin bores aligned with one another along a pin bore axis; and
a pair of skirt portions arranged on opposite sides of said pin bore axis, each of said skirt portions having a convex outer surface with opposite side edges extending substantially parallel to said central axis to a free end and having a recessed slot extending radially into said convex outer surface to a recessed surface, said recessed surface separating an upper band section of said convex outer surface from a lower band section of said convex outer surface, wherein said recessed slots have upper and lower edges extending generally parallel to a horizontal plane passing through said pin bore axis, wherein said upper and lower edges have different radii of curvature extending from said convex outer surfaces of said skirt portions inwardly toward said recessed surface.

19. The piston of claim 18 wherein at least one of said radii of curvature is parabolic.

20. The piston of claim 18 wherein said upper and lower edges have substantially the same radius of curvature extending between said side edges.

21. The piston of claim 18 wherein said upper and lower edges have different radii of curvature extending between said side edges.

22. A method of constructing a piston, comprising:
providing a piston body having an upper crown portion extending along a central axis with a pair of pin bosses depending from the upper crown and having pin bores aligned with one another along a pin bore axis with a pair of skirt portions arranged on opposite sides of the pin bore axis having a convex outer surface; and
forming a recessed slot extending radially into the convex outer surface with at least a portion of the recessed slot formed as a through opening separating an upper band section of the convex outer surface from a lower band section of the convex outer surface.

23. A method of constructing a piston, comprising:
Providing a piston body having an upper crown portion extending along a central axis with a pair of pin bosses depending from the upper crown and having pin bores aligned with one another along a pin bore axis with a pair of skirt portions arranged on opposite sides of the pin bore axis having a convex outer surface; and
forming a recessed slot extending radially into the convex outer surface at least in part in one of a forging or casting process, and further including deburring edges of the recessed slot.

24. A method of constructing a piston, comprising:
providing a piston body having an upper crown portion extending along a central axis with a pair of pin bosses depending from the upper crown and having pin bores aligned with one another along a pin bore axis with a pair of skirt portions arranged on opposite sides of the pin bore axis having a convex outer surface; and
forming a recessed slot extending radially into the convex outer surface such that at least a portion of the recessed slot has a recessed surface separating an upper band section of the convex outer surface from a lower band section of the convex outer surface, and further including forming at least one through opening through the recessed surface.

\* \* \* \* \*